(12) United States Patent
Luniya et al.

(10) Patent No.: US 12,189,750 B2
(45) Date of Patent: Jan. 7, 2025

(54) SECURE OFFLOADED DATA TRANSFER

(71) Applicant: VMWARE, INC., Palo Alto, CA (US)

(72) Inventors: Amit Anandram Luniya, Pune (IN); Sujay Shrikant Godbole, Boston, MA (US)

(73) Assignee: VMware LLC, Palo Alto, CA (US)

( * ) Notice: Subject to any disclaimer, the term of this patent is extended or adjusted under 35 U.S.C. 154(b) by 304 days.

(21) Appl. No.: 17/839,490

(22) Filed: Jun. 14, 2022

(65) Prior Publication Data

US 2023/0350997 A1     Nov. 2, 2023

(30) Foreign Application Priority Data

Apr. 30, 2022   (IN) .............................. 202241025402

(51) Int. Cl.
*G06F 21/00* (2013.01)
*G06F 21/33* (2013.01)
*G06F 21/62* (2013.01)

(52) U.S. Cl.
CPC .......... *G06F 21/33* (2013.01); *G06F 21/6209* (2013.01)

(58) Field of Classification Search
CPC .............................. G06F 21/33; G06F 21/6209
See application file for complete search history.

(56) References Cited

U.S. PATENT DOCUMENTS

| | | | | |
|---|---|---|---|---|
| 9,380,114 | B1 * | 6/2016 | Holt .................... | H04L 67/1097 |
| 10,379,743 | B1 * | 8/2019 | Gupta ................... | G06F 3/0652 |
| 2018/0239717 | A1 * | 8/2018 | Bhagwat ............. | G06F 12/0868 |
| 2023/0091948 | A1 * | 3/2023 | Venkatanarayanan ....... | |
| | | | | G06F 3/0622 |
| | | | | 711/154 |

OTHER PUBLICATIONS https://docs.microsoft.com/en-gb/windows-hardware/drivers/storage/offloaded-data-transfer; accessed Apr. 28, 2022.
https://docs.microsoft.com/en-us/previous-versions/windows/it-pro/windows-server-2012-r2-and-2012/hh801901(v=ws.11); accessed Apr. 28, 2022.
https://docs.microsoft.com/en-us/windows-hardware/drivers/ddi/ntddstor/ns-ntddstor-_storage_offload_token; accessed Apr. 28, 2022.
https://docs.microsoft.com/en-us/windows-hardware/drivers/ddi/ntifs/ns-ntifs-_fsctl_offload_read_output; accessed Apr. 28, 2022.

* cited by examiner

*Primary Examiner* — William A Corum, Jr.

(74) *Attorney, Agent, or Firm* — King Intellectual Asset Management

(57) ABSTRACT

The disclosure provides an approach for secure offloaded data transfer. Embodiments include receiving, by a security component on a client device, from a storage system connected to the client device, a token associated with a data read request corresponding to a source file on the storage system. Embodiments include determining, by the security component, that the source file is trusted. Embodiments include generating, by the security component, an entry in a trusted token cache based on determining that the source file is trusted, wherein the entry comprises the token. Embodiments include receiving, by the security component, a write request corresponding to a destination file on the storage system, wherein the write request comprises the token or a different token. Embodiments include determining, by the security component, based on the trusted token cache, whether to perform one or more operations related to the write request.

20 Claims, 6 Drawing Sheets

SECURE OFFLOADED DATA TRANSFER

RELATED APPLICATIONS

Benefit is claimed under 35 U.S.C. 119(a)-(d) to Foreign Application Serial No. 202241025402 filed in India entitled "SECURE OFFLOADED DATA TRANSFER", on Apr. 30, 2022, by VMware, Inc., which is herein incorporated in its entirety by reference for all purposes.

BACKGROUND

An offloaded data transfer (ODX) allows data to be efficiently transferred from one location on a storage system (e.g., a physical or virtual storage system) to another location on the storage system without transferring the data to a client device (e.g., a physical or virtual computing device connected to the storage system) from which the data transfer operation is initiated.

In an ODX, a source file and a destination file can be on the same storage volume, two different storage volumes hosted by the same physical or virtual machine, a local storage volume and a remote storage volume (e.g., using server message block (SMB2 or SMB3), which is a network file sharing protocol), or two storage volumes on two different machines (e.g., which can also be done using SMB2 or SMB3). In an ODX operation, a client device sends a read request for the source file to the storage system and the storage system sends a unique token in response. The client device then sends a write request, indicating the destination file, along with the unique token, to the storage system, and the storage system transfers the data from the source file to the destination file if it recognizes the token.

While ODX provides many benefits, it can lead to security vulnerabilities without proper handling by a security solution. Accordingly, there is a need in the art for improved techniques for ensuring security of an ODX operations.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
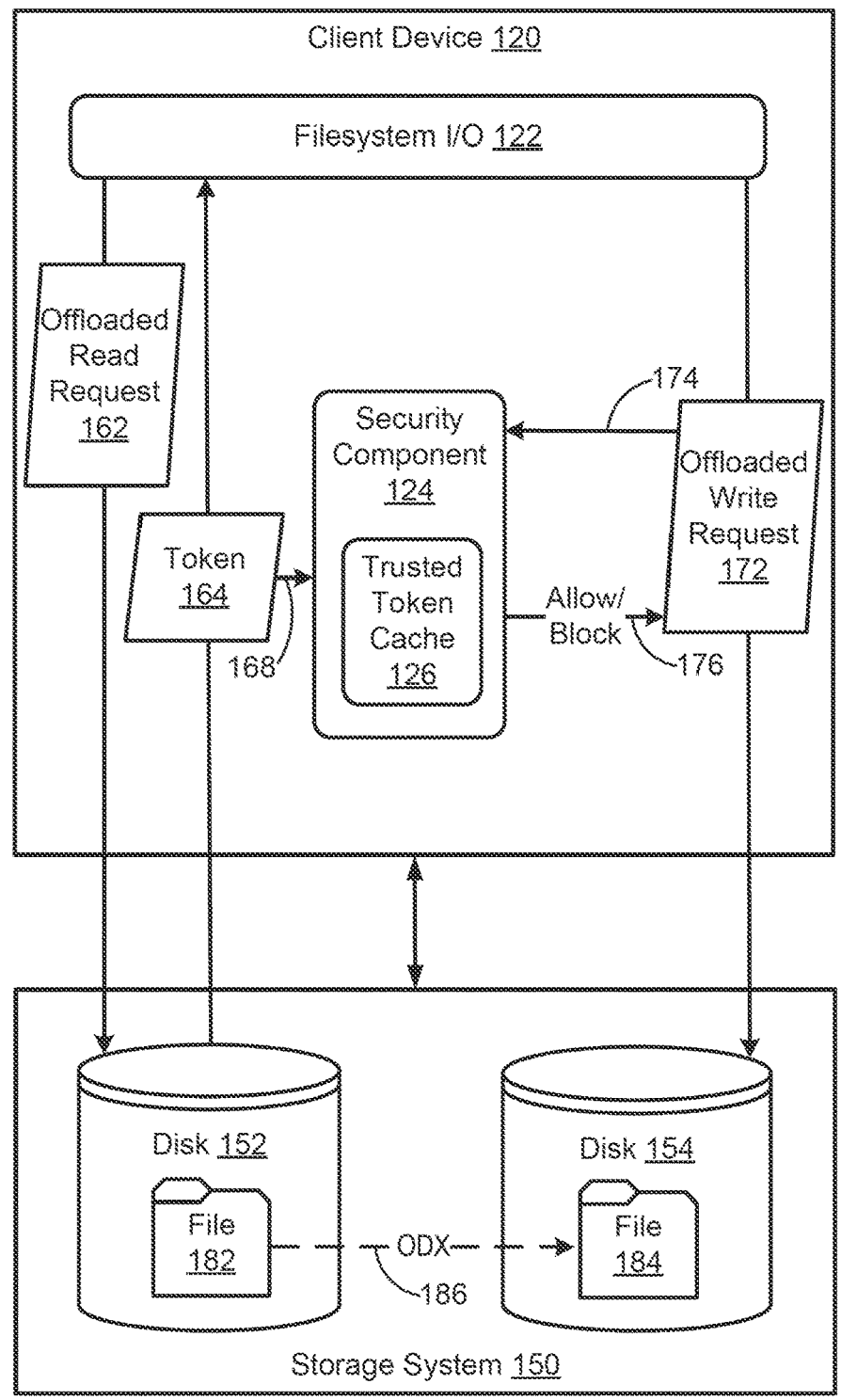
FIG. 1 is an illustration of example computing components related to secure offloaded data transfer.

The present disclosure provides an approach for secure offloaded data transfer. An offloaded data transfer (ODX) is a tokenized operation that allows data to be efficiently transferred from one location on a storage system (e.g., a physical or virtual storage system) to another location on the storage system without transferring the data to a client device (e.g., a computing device connected to the storage system) from which the data transfer operation is initiated. For example, a client device may send a read request for a source file to a storage system and the storage system may send a unique token in response. The client device may then send a write request, indicating a destination file, along with the unique token, to the storage system, and the storage system transfers the data from the source file to the destination file if it recognizes the token. A physical storage system generally refers to one or more physical disks, while a virtual storage system generally refers to one or more virtual disks represented by files stored on physical disks. Requests sent to a storage system are generally processed by a controller device of the storage system that is coupled to one or more disks of the storage system.

While ODX provides many benefits, such as a reduction of resource utilization on the client device (e.g., due to the data being copied directly between locations on the storage system without being transferred to the client device), it can lead to security vulnerabilities without proper handling by a security solution. For example, a malicious actor may use ODX to transfer data (e.g., malicious code) from an untrusted source file to a trusted destination file, and then rely on the trusted status of the destination file to execute the malicious code.

Accordingly, embodiments of the present disclosure address security vulnerabilities associated with existing ODX techniques in a resource-efficient manner through the use of a trusted token cache. In certain embodiments, a security component (e.g., which may be a software component that performs security functionality) on a client device receives all communications sent between the client device and a storage system. For example, the security component may be located in a communication path between the client device and a storage system. When the security component receives a token associated with a read request for a source file, the security component determines whether the source file is trusted. For example, the security component may scan all files when they are added to the storage system (e.g., based on security rules, signatures, and/or the like) and may store indications of whether the files are trusted based on whether any issues are identified during the scans. The indications of whether the files are trusted may be used in conjunction with tokens (which are used to confirm that a write request corresponds to a valid read request for an offloaded data transfer operation) for secure offloaded data transfer. Thus, when the security component receives the token associated with the read request for the source file, the security component is able to determine whether the source file is trusted based on its previous scan of the source file. If the source file is trusted, the security component may add the token to the trusted token cache. If the source file is not trusted, then the security component may not add the token to the trusted token cache or, alternatively, may add the token to the trusted token cache with an indication that the token is not trusted. In some embodiments, if the source file is not trusted, the security component may retrieve the source file from the storage system and scan the source file in order to determine whether to add the token to as a trusted token to the trusted token cache. Alternatively, untrusted source files may be scanned when a write request is received, as described below.

Subsequently, the client device issues a write request along with the token, and the security component receives the write request. The security component may then determine whether the token included with the write request is a trusted token stored in the trusted token cache. If the token is trusted, then the security component may allow the write request to proceed (e.g., the security component may forward the write request on to the storage system or to a next hop in the path). Otherwise, if the token is not trusted, then the security component may deny the write request and/or may delay the write request until the security component is able to scan the source file. For example, if the token is not trusted, the security component may retrieve the source file from the storage system and scan the source file in order to determine whether to allow the write request to proceed. In other embodiments, if the token is not trusted, the security component may allow the write request to proceed and mark the destination file as untrusted. In such embodiments, the destination file would need to be retrieved and scanned prior to executing the destination file.

In some cases, the security component may remove or modify entries in the trusted token cache based on certain conditions occurring. For example, each entry may be deleted or changed to an untrusted token after a time period has elapsed since the entry was created (e.g., to ensure that tokens are not used beyond the time in which they were intended to be used). In another example, if a write request for a given file is received when a token corresponding to a read request for the given file is present in the trusted token cache, then the token may be removed from the trusted token cache or changed to an untrusted token in the trusted token cache (e.g., because the trusted status of the token was based on a trusted status of the given file, which has now been modified and may no longer be trusted). It is noted that the stored indications of whether files are trusted are independent of the trusted token cache, as these stored indications indicate whether a file has been scanned in its present form and not necessarily that an offloaded data transfer operation is authorized for the file. For example, an indication that a file is trusted may be removed or changed if the file changes, such as if new data is written to the file (e.g., unless, in some embodiments, the new data is copied to the file from another file that has already been scanned and is therefore trusted). However, the indication that the file is trusted will not necessarily be removed or changed if a token corresponding to an offloaded data transfer operation for the file is removed from the trusted token cache or changed to an untrusted token, because the token may be removed for reasons unrelated to the file becoming untrusted (e.g., such as a time period elapsing, which may indicate that the particular offloaded data transfer operation corresponding to the token is no longer authorized but not necessarily that the file is no longer trusted). It is noted that a write request for an offloaded data transfer operation may not necessarily include an identifier of the source file (e.g., the write request may identify the destination file and the token, but may not directly identify the source file, as the storage system is able to identify the source file based on the token). As such, the trusted token cache allows the security component to determine whether write requests correspond to read requests from trusted source files. In alternative embodiments, if the write request identifies the source file, the security component could determine whether to allow the write request to proceed and/or whether to mark the destination file as untrusted based only on its stored indication of whether the source file is trusted.

Embodiments of the present disclosure constitute an improvement over existing techniques for ODX. For example, by verifying that tokens included with write requests correspond to tokens associated with read requests for trusted source files, techniques described herein ensure that ODX operations are not used to transfer data from untrusted files to trusted files without first scanning the untrusted files. Furthermore, by maintaining a trusted token cache, embodiments of the present disclosure allow a security component to ensure the security of ODX operations without scanning a source file each time data is copied from the source file, thereby reducing the computing resources (e.g., communication, processing, and/or memory resources) and time required to provide such security.

It is noted that while certain embodiments are described herein with respect to ODX, the present disclosure is also applicable to other types of data transfer operations where data is transferred from one location on a storage system to another location on a storage system without necessarily being transferred to a client device form which the data transfer is initiated. Furthermore, ODX and similar types of offloaded transfer operations require support on the storage system of such operations. Generally, if a storage system receives a request for an ODX or other similar offloaded transfer operation and the storage system does not support such an operation, a traditional copy operation will be performed, such as by copying the data from the source file to the client device and then from the client device to the destination file.

FIG. 1 is an illustration 100 of example computing components related to secure offloaded data transfer.

A client device 120 is connected to a storage system 150, such as via a direct connection or a network connection. Client device 120 generally represents a physical or virtual computing device, such as a desktop computer, laptop computer, mobile device, virtual machine (VM), server computer, and/or the like. Client device 120 may include a physical processor and memory. In some embodiments, client device is a VM that runs on physical computing resources of a physical computing device. Storage system 150 represents a physical or virtual storage entity, such as a physical disk, virtual disk (e.g., a file representing a disk that is stored on a physical disk), storage area network (SAN), virtual storage area network (vSAN), and/or the like.

Client device 120 comprises file system input/output (I/O) 122, which generally represents file read and write operations performed (e.g., by applications) on client device 120 with respect to a file system associated with storage system 150. Client device 120 further comprises a security component 124, which generally performs security functionality for client device 120, such as scanning of files stored on storage system 150 and determining whether to allow file I/O operations to proceed. According to certain embodiments, security component 124 scans every file (or at least every file of a certain type, such as executable files and/or otherwise interesting files, such as packages) when it is added to storage system 150, such as based on security rules, signatures, and/or the like, in order to identify potentially problematic content within files. Once security component 124 has scanned a file and found no potential issues (and/or after any issues have been addressed, such as through manual review and/or revision), it may consider the file a trusted file. Security component 124 may be an existing component on client device 120 that is extended to provide functionality described herein related to secure offloaded data transfer.

In some embodiments, security component 124 is a software component that is part of a communication path by which communications are sent between client device 120 and storage system 150 (e.g., security component 124 is a hop in a series of hops by which packets are routed from locations on client device 120 to locations on storage system 150). Thus, security component 124 receives all communications related to filesystem I/O 122. For example, security component 124 may receive these communications from a filter driver of client device 120. A filter driver is generally a software component (e.g., an operating system driver) that extends or modifies the function of one or more devices (e.g., storage devices such as storage system 150) or supports specialized devices in a computer.

While security component 124 could retrieve and scan a source file every time security component 124 receives a write request that involves copying data from the source file to a destination file, this would involve a significant amount of computing resources of client device 120, and may defeat the purpose of ODX operations. As such, according to embodiments of the present disclosure, security component 124 maintains a trusted token cache 126 of all tokens associated with read requests for files that are trusted by security component 124 (e.g., based on prior scans of the files). As described in more detail below, trusted token cache 126 may include tokens and, in some embodiments, file names and/or trust indicators associated with the tokens. Security component 124 uses trusted token cache 126 to determine whether to allow write requests to proceed and/or whether to mark destination files as untrusted following write operations, such as based on whether the write requests include tokens that are present as trusted tokens in trusted token cache 126. Thus, security component 124 is able to provide security for ODX operations in a resource-efficient manner that does not negate the efficiency-related benefits of ODX operations.

Storage system 150 includes, as an example, two disks 152 and 154, which may represent physical and/or virtual disks within storage system 150. In one example, disks 152 and 154 are separate storage volumes within a commonly-managed pool of storage, such as a storage array or SAN. A storage volume is an identifiable unit of data storage, such as a disk. In other embodiments, storage system 150 may represent more than one physical device.

A read request 162 is sent from filesystem I/O 120 to disk 152. In an example, read request 162 corresponds to a requested ODX operation 186 by which data from file 182 on disk 152 is to be transferred to file 184 on disk 154. Storage system 150 responds to read request 162 with a token 164 for the read request. Token 164 is a unique identifier of read request 162 that serves as a shared secret between storage system 150 and filesystem I/O 122 of client device 120. In one example, token 164 is an array (e.g., a 512 byte array) that represents file data within a range specified in read request 162. In practice, token 164 may be any type of unique identifier of read request 162 that is shared between storage system 150 and client device 120. In some embodiments, storage system 150 also provides a lifespan of token 164, such as an amount of time that token 164 is valid.

Security component 124 receives token 164 and, according to certain embodiments, determines whether token 164 corresponds to a trusted file. For example, security component 124 may determine whether it has previously scanned file 182 (indicated in read request 162) and, if so, whether it is a trusted file. If security component 124 determines that file 182 is trusted, then security component 124 may add token 164 to trusted token cache 126 (e.g., along with an identifier such as a filename of file 182 and/or an indication that token 164 is trusted). If security component 124 determines that file 182 is not trusted, then security component 124 may not add token 164 to trusted token cache 126 or, alternatively, may add token 164 to trusted token cache 126 with an indication that token 164 is not trusted. Security component 124 may keep trusted token cache 126 up to date, such as by removing expired tokens (e.g., after a time period elapses) and/or marking expired tokens as untrusted. Furthermore, if a token in trusted token cache 126 corresponds to a source file that has changed since the token was generated, such as if a subsequent write request to the source file is received, trusted token cache 126 may remove the token from trusted token cache 126 or mark the token as untrusted in trusted token cache 126.

A write request 172 is sent from filesystem I/O 122 to storage system 150, such as corresponding to ODX operation 186. According to certain embodiments, token 164 is included with write request 172.

Security component 124 receives write request 172 and determines whether to allow write request 172 to proceed and/or whether to mark the destination file 184 as untrusted following fulfilment of write request 172. For example, security component 124 may determine whether a token included with write request 172 is indicated as a trusted token in trusted token cache 126. If the token included with write request 172 is a trusted token, then security component 124 may allow write request 172 to proceed at step 176 (e.g., forwarding write request 172 to storage system 150, which will then transfer the data from file 182 to file 184 in order to perform ODX operation 186) and may mark file 184 as trusted. If the token included with write request 172 is not a trusted token, then security component 124 may retrieve file 182 from storage system 150 and scan file 182 in order to determine whether to allow or block write request 172 and/or may allow write request 172 to proceed without a scan of file 182 and may mark file 184 as untrusted following the fulfillment of write request 172 at step 176. For example, if a scan is performed, and if no issues are discovered during the scan of file 182, then security component 124 may allow write request 172 to proceed. If any issues are discovered during a scan of file 182, then security component 124 may block write request 172 or, in some embodiments, delay write request 172 until the issues are resolved (or confirmed not to represent security issues).

Figure 2:
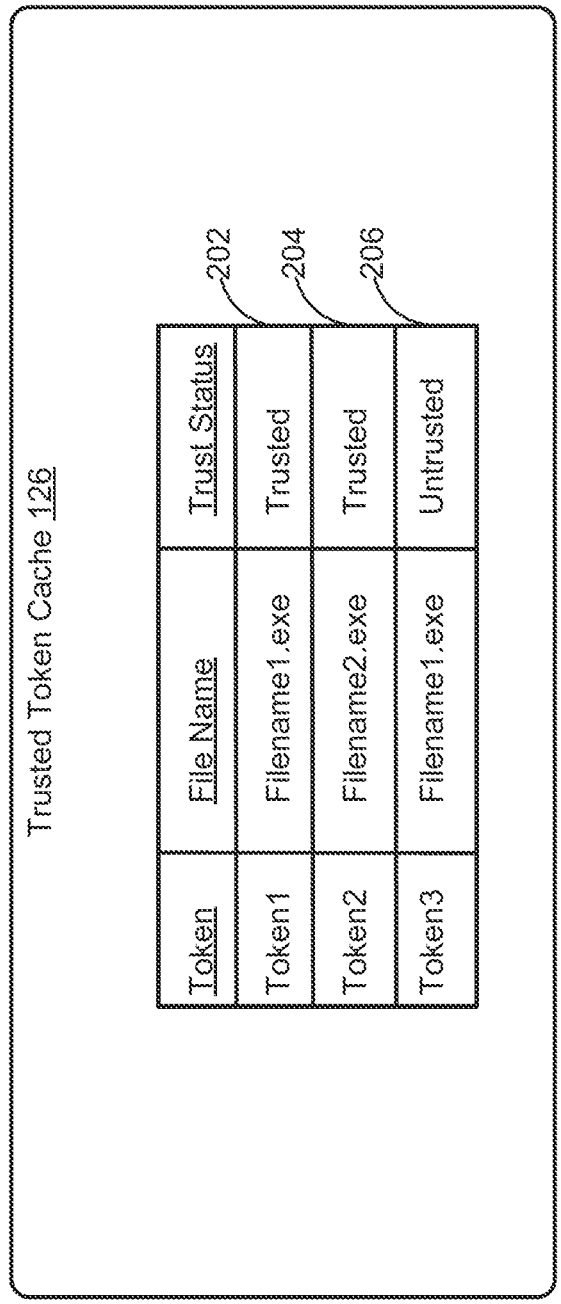
FIG. 2 illustrates an example of a trusted token cache related to secure offloaded data transfer.

FIG. 2 is an illustration 200 of an example trusted token cache related to secure offloaded data transfer. Illustration 200 includes trusted token cache 126 of FIG. 1.

Trusted token cache 126 includes entries 202, 204, and 206, each of which corresponds to a token associated with a read request and includes a token, a file name, and a trust status. In other embodiments, entries 202, 204, and 206 may not include file names and/or trust statuses, and/or may include other fields.

Entry 202 includes a token "Token1", a file name "Filename1.exe", and a trust status of "trusted" (e.g., entry 202 may correspond to a trusted file).

Entry 204 includes a token "Token2", a file name "Filename2.exe", and a trust status of "trusted" (e.g., entry 204 may correspond to a trusted file).

Entry 206 includes a token "Token3", a file name "Filename3.exe", and a trust status of "untrusted" (e.g., entry 202 may correspond to an untrusted file, such as a file that has not yet been scanned or a file for which issues were discovered during a scan). In alternative embodiments untrusted tokens are not included in trusted token cache 126. For example, entry 206 may not be included in trusted token cache 126.

The tokens in entries 202, 204, and 206 are compared to tokens included with write requests in order to determine whether to allow the write requests to proceed. As described in more detail below with respect to FIG. 3B, the file names in entries 202, 204, and 206 may be compared to file names indicated in write requests in order to determine whether to remove or modify entries 202, 204, and/or 206. For example, if a file name in an entry corresponds to a file name indicated in a write request, then the entry may be removed from trusted token cache 126 or the trust status of the entry may be changed to "untrusted" (e.g., because the file to which the entry corresponds has been modified, and the token may no longer be trusted).

Furthermore, entries 202, 204, and 206 may have time limits. For example, a given entry may be removed or changed to untrusted after a time period has elapsed. The time period may be received from the storage system (e.g., an expiration time for the token) or may be set within the security component.

Figure 3A:
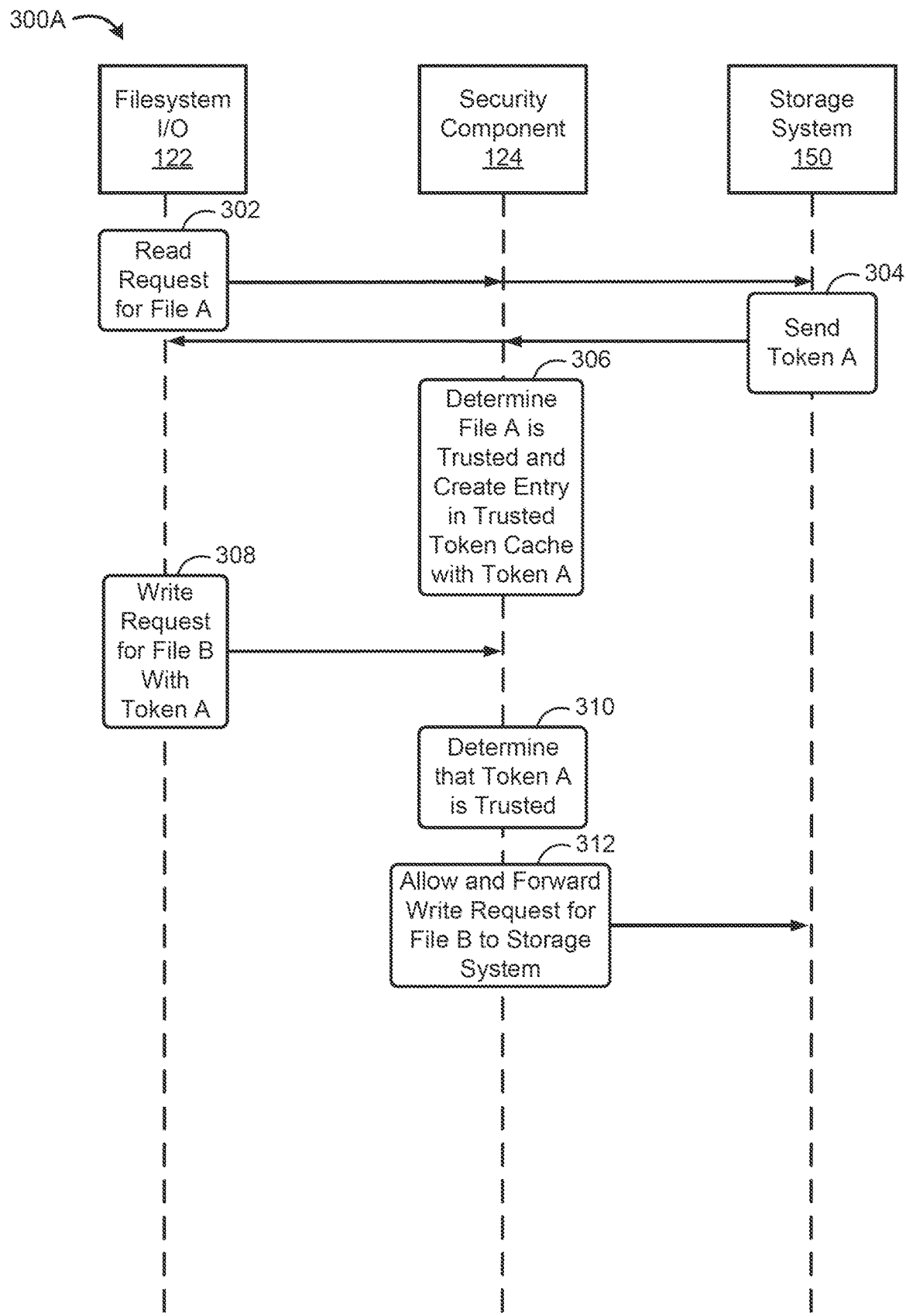
FIGS. 3A-3C illustrates example call flows related to secure offloaded data transfer.

FIG. 3A is an illustration 300A of an example related to secure offloaded data transfer. Illustration 300A includes filesystem I/O 122, security component 124, and storage system 150 of FIG. 1.

At step 302, a read request for file A is sent from filesystem I/O 122 to storage system 150, and is also received by security component 124. For example, the read request may correspond to a requested ODX operation by which data from file A is to be transferred to file B.

At step 304, storage system 150 responds to the read request with token A. Token A is received by security component 124 and filesystem I/O 122.

At step 306, security component 124 determines that file A is trusted and creates an entry in a trusted token cache with token A. For example, security component 124 may confirm that file A (indicated in the read request) is trusted (e.g., based on a previous scan of file A), and may determine to add token A to the trusted token cache as a trusted token accordingly. The entry in the trusted token cache with token A may also include an identifier such as a file name of file A.

At step 308, a write request for file B, including token A, is sent from filesystem I/O 122 to storage system 150, and is received by security component 124. For example, the write request sent at step 308 may correspond to the ODX operation associated with the read request sent at step 302 by which data from file A is to be transferred to file B.

At step 310, security component 124 determines that token A is trusted, such as based on token A being present as a trusted token in the trusted token cache.

At step 312, security component 124 allows the write request for file B and forwards the write request to storage system 150 (either directly or to a next hop in a communication path towards storage system 150). Storage system 150 may proceed with the requested ODX operation by transferring the data from file A to file B. In some embodiments security component 124 allows the write request for file B to proceed regardless of whether token A is trusted, and marks file B as untrusted when the write is performed if token A is untrusted.

Figure 3B:
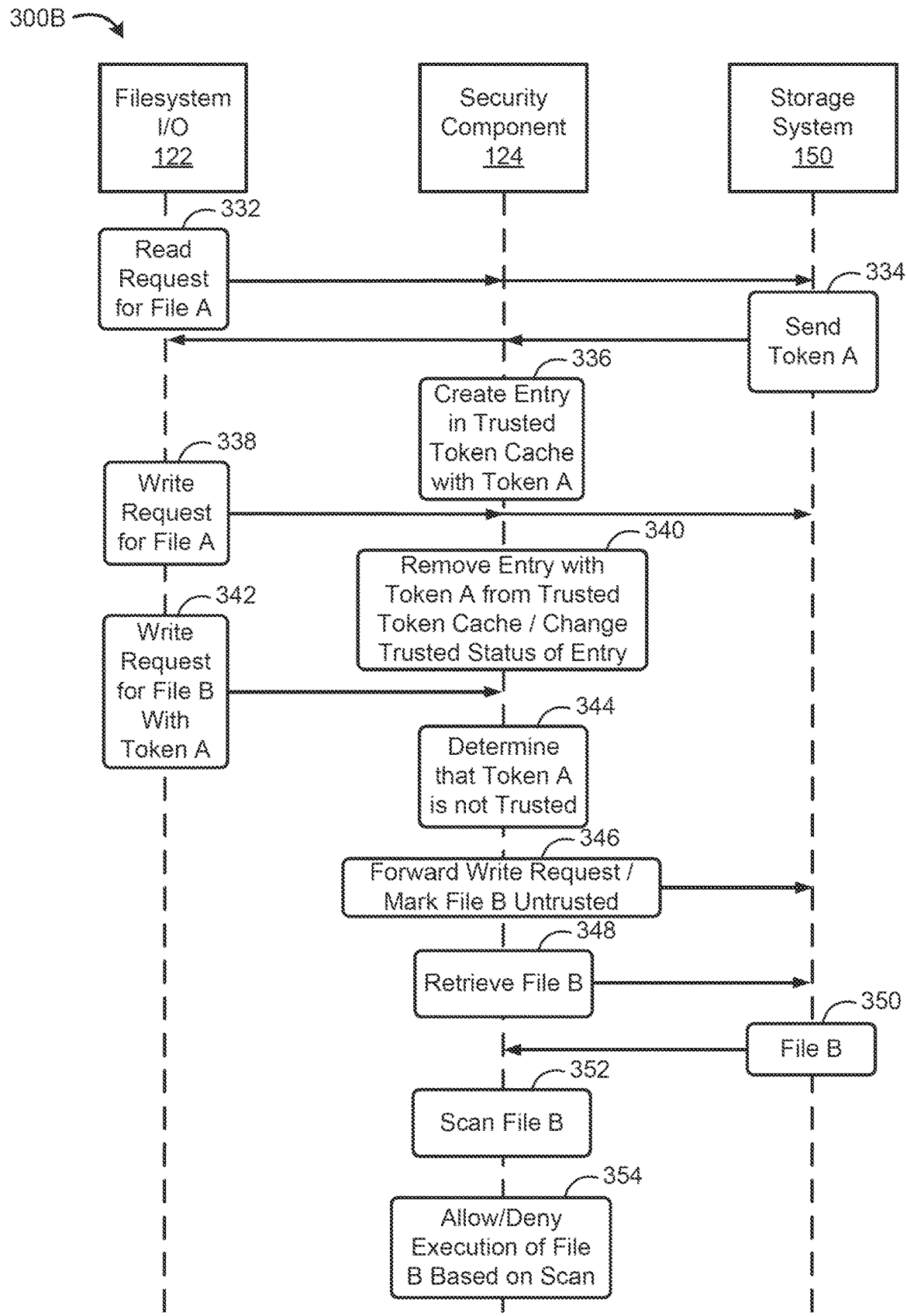

FIG. 3B is an illustration 300B of an example related to secure offloaded data transfer. Illustration 300B includes filesystem I/O 122, security component 124, and storage system 150 of FIG. 1.

At step 332, a read request for file A is sent from filesystem I/O 122 to storage system 150, and is also received by security component 124. For example, the read request may correspond to a requested ODX operation by which data from file A is to be transferred to file B.

At step 334, storage system 150 responds to the read request with token A. Token A is received by security component 124 and filesystem I/O 122.

At step 336, security component 124 creates an entry in the trusted token cache with token A. For example, security component 124 may confirm that file A (indicated in the read request) is trusted (e.g., based on a previous scan of file A), and may determine to add token A to the trusted token cache as a trusted token accordingly. The entry in the trusted token cache with token A may also include an identifier such as a file name of file A.

At step 338, a write request for file A is sent from filesystem I/O 122 to storage system 150, and is also received by security component 124. For example, the write request may include a different token than token A or may not be associated with an ODX operation.

At step 340, security component 124 removes the entry with token A from the trusted token cache or, alternatively, changes a trusted status of the entry to untrusted. For example, security component 124 may determine that the write request received at step 338 corresponds to file A, and may determine that the entry with token A is associated with the file name of file A in the trusted token cache, and may accordingly determine that token A can no longer be trusted (e.g., because the trusted status of token A is based on file A previously being trusted, and file A is now being changed). While not shown, security component 124 may also determine whether to allow the write request received at step 338 to proceed, such as based on one or more security rules and/or based on the trusted token cache (e.g., if the write requests corresponds to a different ODK operation).

At step 342, a write request for file B, including token A, is sent from filesystem I/O 122 to storage system 150, and is received by security component 124. For example, the write request sent at step 342 may correspond to the ODX operation associated with the read request sent at step 332 by which data from file A is to be transferred to file B.

At step 344, security component 124 determines that token A is not trusted, such as based on token A not being present in the trusted token cache or being indicated as untrusted in the trusted token cache (e.g., since token A was removed or changed to untrusted at step 340).

At step 346, security component 124 forwards the write request to storage system 150 and marks file B as untrusted based on determining that token A is not trusted so that file B will not be executed without first being scanned. In alternative embodiments, security component 124 retrieves file A from storage system 150, and storage system 150 sends file A to security component 124. For example, in such alternative embodiments, since token A is untrusted, security component 124 may scan file A in order to determine whether to allow the write request sent at step 342 to proceed and/or whether to mark file B as trusted or untrusted. Once the write request is allowed, it may be forwarded to storage system 150, which may proceed with the requested ODX operation by transferring the data from file A to file B.

At step 348, security component 124 retrieves file B from storage system 150, and storage system 150 sends file B to security component 124 at step 350. For example, file B may be retrieved for scanning in response to a request to execute file B based on file B being marked as untrusted at step 346.

At step 352, security component 124 scans file B. For example, one or more security rules, signatures, and/or the like may be used to determine whether file B contains any potential security issues (e.g., code or other content that may be a security risk).

At step 354, security component 124 allows or denies execution of file B based on the scan of file B. For example, if no issues are discovered during the scan of file B, then file B may be allowed to execute. If one or more issues are discovered during the scan of file B, then the execution of file B may be denied or delayed until any issues are resolved.

Figure 3C:
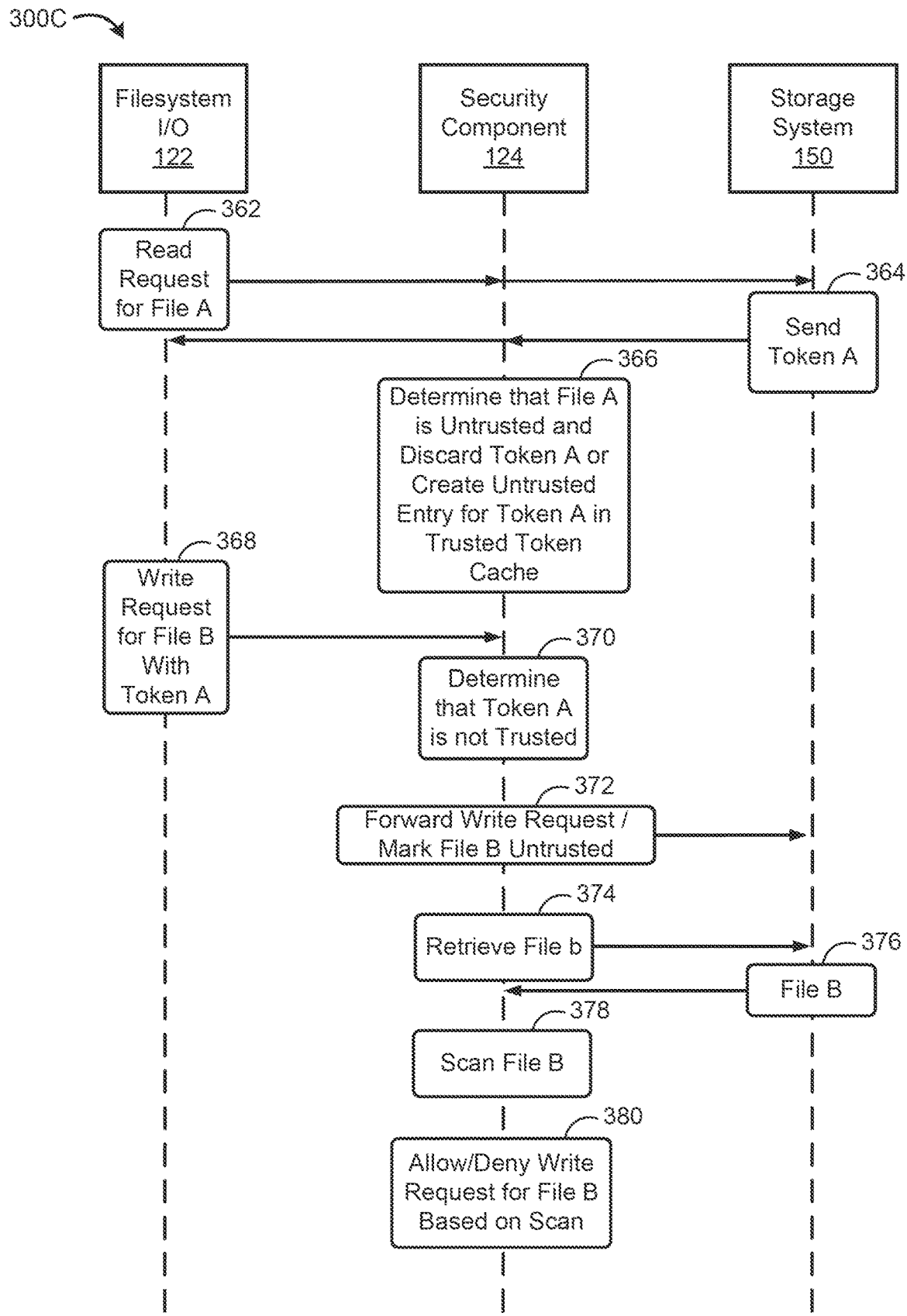

FIG. 3C is an illustration 300C of an example related to secure offloaded data transfer. Illustration 300C includes filesystem I/O 122, security component 124, and storage system 150 of FIG. 1.

At step 362, a read request for file A is sent from filesystem I/O 122 to storage system 150, and is also received by security component 124. For example, the read request may correspond to a requested ODX operation by which data from file A is to be transferred to file B.

At step 364, storage system 150 responds to the read request with token A. Token A is received by security component 124 and filesystem I/O 122.

At step 366, security component 124 determines that file A is untrusted (e.g., because file A has not yet been scanned or has changed since it was scanned) and either discards token A (e.g., without creating an entry in the trusted token cache) or creates an entry in the trusted token cache that indicates token A is untrusted.

At step 368, a write request for file B, including token A, is sent from filesystem I/O 122 to storage system 150, and is received by security component 124. For example, the write request sent at step 368 may correspond to the ODX operation associated with the read request sent at step 362 by which data from file A is to be transferred to file B.

At step 370, security component 124 determines that token A is not trusted, such as based on token A not being present in the trusted token cache or being indicated as untrusted in the trusted token cache.

At step 372, security component 124 forwards the write request to storage system 150 and marks file B as untrusted based on token A not being trusted. In alternative embodiments, since token A is untrusted, security component 124 may retrieve file A from storage system 150 and scan file A in order to determine whether to allow the write request sent at step 372 to proceed or file A may be retrieved and scanned upon determining that file A is untrusted at step 366.

At step 374, security component 124 retrieves file B from storage system 150, and storage system 150 sends file B to security component 124 at step 376. For example, file B may be retrieved for scanning in response to a request to execute file B based on file B being marked as untrusted at step 372.

At step 378, security component 124 scans file B. For example, one or more security rules, signatures, and/or the like may be used to determine whether file B contains any potential security issues (e.g., code or other content that may be a security risk).

At step 380, security component 124 allows or denies execution of file B based on the scan of file B. For example, if no issues are discovered during the scan of file B, then execution of file B may be allowed to proceed. If one or more issues are discovered during the scan of file B, then execution may be denied or delayed until any issues are resolved.

Figure 4:
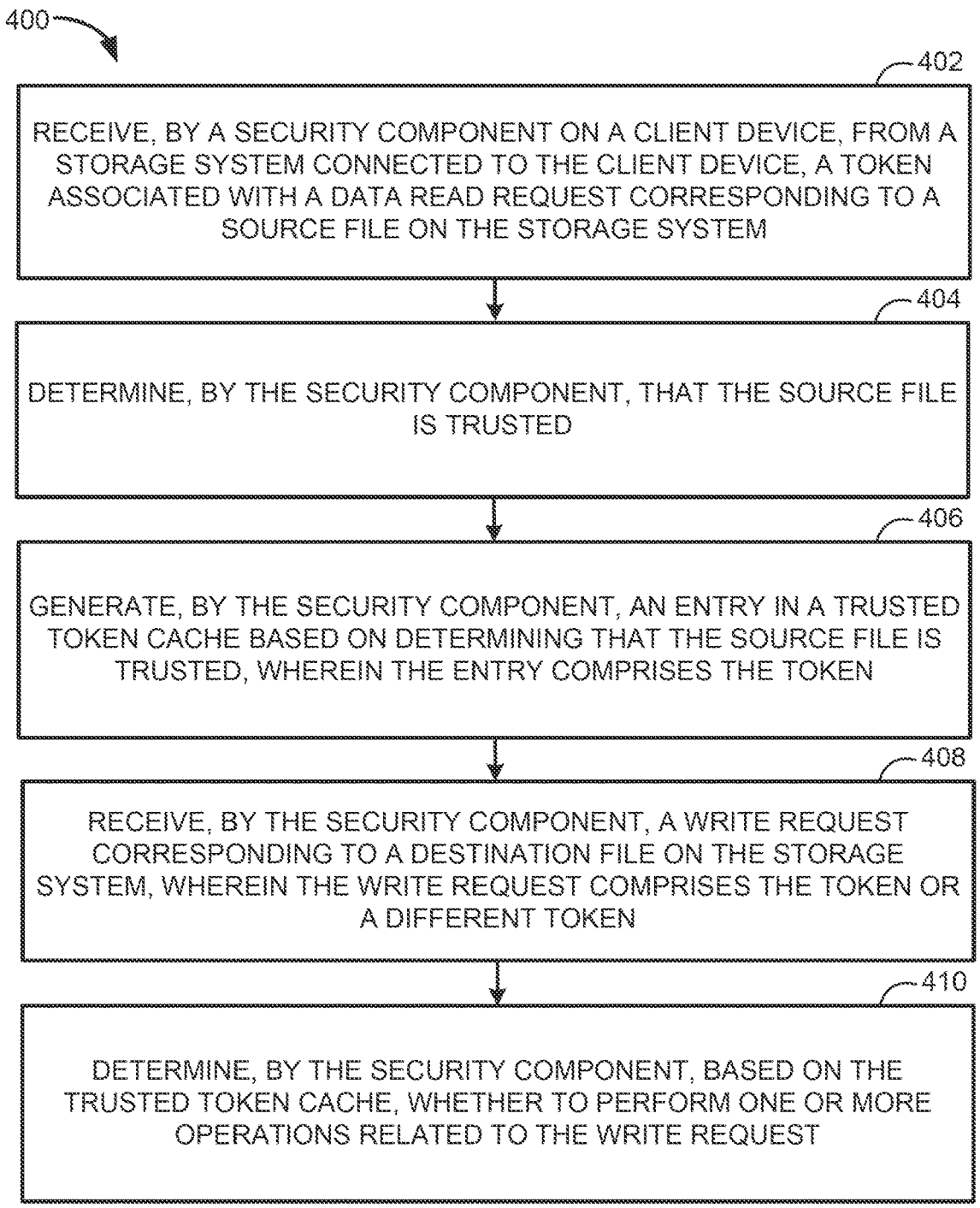
FIG. 4 depicts example operations related to secure offloaded data transfer.

FIG. 4 depicts example operations 400 related to secure offloaded data transfer. For example, operations 400 may be performed by security component 124 of FIGS. 1 and 3.

Operations 400 begin at step 402, with receiving, by a security component on a client device, from a storage system connected to the client device, a token associated with a data read request corresponding to a source file on the storage system.

Operations 400 continue at step 404, with determining, by the security component, that the source file is trusted.

In some embodiments, determining, by the security component, that the source file is trusted is based on evaluating, by the security component, at a point prior to receiving the token, the source file according to one or more security rules.

Operations 400 continue at step 406, with generating, by the security component, an entry in a trusted token cache based on determining that the source file is trusted, wherein the entry comprises the token.

Operations 400 continue at step 408, with receiving, by the security component, a write request corresponding to a destination file on the storage system, wherein the write request comprises the token or a different token.

In some embodiments, the read request and the write request correspond to an offloaded data transfer operation initiated from the client device.

Operations 400 continue at step 410, with determining, by the security component, based on the trusted token cache, whether to perform one or more operations related to the write request.

In certain embodiments, the one or more operations related to the write request comprise one or more of: blocking the write request; blocking an execution request for the destination file that is received after the write request; changing a trust status of the destination file; or removing the entry from the trusted token cache.

In some embodiments, the write request comprises the token, and determining, by the security component, based on the trusted token cache, whether to perform the one or more operations related to the write request comprises determining to allow the write request based on the token being in the secure token cache.

In certain embodiments, the destination file indicated in the write request is the source file, and determining, by the security component, based on the trusted token cache, whether to perform the one or more operations related to the write request comprises determining to remove the entry from the secure token cache. For example, the entry may comprises a file name of the source file, and the file name of the source file may be indicated in the write request Some embodiments further comprise removing the entry from the secure token cache based on a time period elapsing.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and/or the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of secure offloaded data transfer, comprising:
receiving, by security software on a client device, from a storage system connected to the client device, a token associated with a data read request corresponding to a source file on the storage system;
determining, by the security software and based on evaluating, by the security software, at a point prior to receiving the token, the source file according to one or more security rules, that the source file is trusted;
generating, by the security software, an entry in a trusted token cache based on determining that the source file is trusted, wherein the entry comprises the token;
receiving, by the security software, a write request corresponding to a destination file on the storage system, wherein the write request comprises the token or a different token, and the read request and the write request correspond to an offloaded data transfer operation initiated from the client device; and
determining, by the security software, based on the trusted token cache, whether to perform one or more operations related to the write request.

2. The method of claim 1, wherein the one or more operations related to the write request comprise one or more of:
blocking the write request;
blocking an execution request for the destination file that is received after the write request;
changing a trust status of the destination file;
or removing the entry from the trusted token cache.

3. The method of claim 1, wherein the write request comprises the token, and wherein determining, by the security software, based on the trusted token cache, whether to perform the one or more operations related to the write request comprises determining to allow the write request based on the token being in the secure token cache.

4. The method of claim 1, wherein the destination file indicated in the write request is the source file, and wherein determining, by the security software, based on the trusted token cache, whether to perform the one or more operations related to the write request comprises determining to remove the entry from the secure token cache.

5. The method of claim 4, wherein the entry comprises a file name of the source file, and wherein the file name of the source file is indicated in the write request.

6. The method of claim 1, further comprising removing the entry from the secure token cache based on a time period elapsing.

7. A system for secure offloaded data transfer, the system comprising:
- at least one memory; and
- at least one processor coupled to the at least one memory, the at least one processor and the at least one memory configured to:
  - receive, by security software on a client device, from a storage system connected to the client device, a token associated with a data read request corresponding to a source file on the storage system;
  - determine, by the security software and based on evaluating, by the security component, at a point prior to receiving the token, the source file according to one or more security rules, that the source file is trusted;
  - generate, by the security software, an entry in a trusted token cache based on determining that the source file is trusted, wherein the entry comprises the token;
  - receive, by the security software, a write request corresponding to a destination file on the storage system, wherein the write request comprises the token or a different token, and the read request and the write request correspond to an offloaded data transfer operation initiated from the client device; and
  - determine, by the security software, based on the trusted token cache, whether to perform one or more operations related to the write request.

8. The system of claim 7, wherein the one or more operations related to the write request comprise one or more of:
- blocking the write request;
- blocking an execution request for the destination file that is received after the write request;
- changing a trust status of the destination file;
- or removing the entry from the trusted token cache.

9. The system of claim 7, wherein the write request comprises the token, and wherein determining, by the security software, based on the trusted token cache, whether to perform the one or more operations related to the write request comprises determining to allow the write request based on the token being in the secure token cache.

10. The system of claim 7, wherein the destination file indicated in the write request is the source file, and wherein determining, by the security software, based on the trusted token cache, whether to perform the one or more operations related to the write request comprises determining to remove the entry from the secure token cache.

11. The system of claim 10, wherein the entry comprises a file name of the source file, and wherein the file name of the source file is indicated in the write request.

12. The system of claim 7, further comprising removing the entry from the secure token cache based on a time period elapsing.

13. A non-transitory computer-readable medium storing instructions that, when executed by one or more processors, cause the one or more processors to:
- receive, by security software on a client device, from a storage system connected to the client device, a token associated with a data read request corresponding to a source file on the storage system;
- determine, by the security software and based on evaluating, by the security software, at a point prior to receiving the token, the source file according to one or more security rules, that the source file is trusted;
- generate, by the security software, an entry in a trusted token cache based on determining that the source file is trusted, wherein the entry comprises the token;
- receive, by the security software, a write request corresponding to a destination file on the storage system, wherein the write request comprises the token or a different token, and the read request and the write request correspond to an offloaded data transfer operation initiated from the client device; and
- determine, by the security software, based on the trusted token cache, whether to perform one or more operations related to the write request.

14. The non-transitory computer-readable medium of claim 13, wherein the one or more operations related to the write request comprise one or more of:
- blocking the write request;
- blocking an execution request for the destination file that is received after the write request;
- changing a trust status of the destination file;
- or removing the entry from the trusted token cache.

15. The non-transitory computer-readable medium of claim 13, wherein the write request comprises the token, and wherein determining, by the security software, based on the trusted token cache, whether to perform the one or more operations related to the write request comprises determining to allow the write request based on the token being in the secure token cache.

16. The non-transitory computer-readable medium of claim 13, wherein the destination file indicated in the write request is the source file, and wherein determining, by the security software, based on the trusted token cache, whether to perform the one or more operations related to the write request comprises determining to remove the entry from the secure token cache.

17. The non-transitory computer-readable medium of claim 16, wherein the entry comprises a file name of the source file, and wherein the file name of the source file is indicated in the write request.

18. The non-transitory computer-readable medium of claim 13, further comprising removing the entry from the secure token cache based on a time period elapsing.

19. The non-transitory computer-readable medium of claim 13, wherein the client device is a virtualized computing instance.

20. The method of claim 1, wherein the client device is a virtualized computing instance.

* * * * *